(12) United States Patent
Coppola et al.

(10) Patent No.: US 8,200,958 B2
(45) Date of Patent: Jun. 12, 2012

(54) CONTENT DELIVERY NETWORK ENCRYPTION

(75) Inventors: Peter Coppola, Tempe, AZ (US); William P. White, Tempe, AZ (US); Tamara Monson, Scottsdale, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 381 days.

(21) Appl. No.: 12/573,542

(22) Filed: Oct. 5, 2009

(65) Prior Publication Data

US 2010/0088505 A1  Apr. 8, 2010

Related U.S. Application Data

(60) Provisional application No. 61/102,809, filed on Oct. 3, 2008.

(51) Int. Cl.
*H04L 29/06* (2006.01)
(52) U.S. Cl. ...................................... 713/153
(58) Field of Classification Search .................. None
See application file for complete search history.

(56) References Cited

U.S. PATENT DOCUMENTS

| | | | |
|---|---|---|---|
| 6,411,725 B1 | 6/2002 | Rhoads | |
| 6,553,413 B1* | 4/2003 | Lewin et al. | 709/219 |
| 6,735,699 B1 | 5/2004 | Sasaki et al. | |
| 6,970,849 B1* | 11/2005 | DeMello et al. | 705/52 |
| 7,426,750 B2 | 9/2008 | Cooper et al. | |
| 7,552,338 B1 | 6/2009 | Swildens et al. | |
| 7,664,864 B2* | 2/2010 | Ball et al. | 709/229 |
| 7,689,532 B1* | 3/2010 | Levy | 713/176 |
| 7,861,306 B2* | 12/2010 | DeMello et al. | 726/26 |
| 8,099,403 B2* | 1/2012 | Levy | 707/705 |
| 2002/0010631 A1 | 1/2002 | Sato et al. | |
| 2002/0138437 A1 | 9/2002 | Lewin et al. | |
| 2002/0161835 A1* | 10/2002 | Ball et al. | 709/203 |
| 2003/0066884 A1* | 4/2003 | Reddy et al. | 235/382.5 |
| 2003/0161473 A1* | 8/2003 | Fransdonk | 380/277 |
| 2004/0093419 A1* | 5/2004 | Weihl et al. | 709/229 |
| 2004/0255115 A1* | 12/2004 | DeMello et al. | 713/156 |

(Continued)

FOREIGN PATENT DOCUMENTS

JP  2005-332241 A  12/2005

(Continued)

OTHER PUBLICATIONS

Green, M. et al, "Content Internetworking Architectural Overview", IETF Internet Draft (available at http://tools.ietf.org/id/draft-ietf-cdi-architecture-00.txt), Feb. 22, 2002.

(Continued)

*Primary Examiner* — Oscar Louie
(74) *Attorney, Agent, or Firm* — Kilpatrick, Townsend & Stockton LLP

(57) ABSTRACT

A system and method for delivering content to end users encrypted within a content delivery network (CDN) for content originators is disclosed. CDNs transport content for content originators to end user systems in a largely opaque manner. Caches and origin servers in the CDN are used to store content. Some or all of the content is encrypted within the CDN. When universal resource indicators (URIs) are received from an end user system, the CDN can determine the key used to decrypt the content object within the CDN before delivery. Where there is a cache miss, an origin server can be queried for the content object, which is encrypted in the CDN.

14 Claims, 7 Drawing Sheets

U.S. PATENT DOCUMENTS

| | | | |
|---|---|---|---|
| 2005/0060266 A1* | 3/2005 | DeMello et al. | 705/57 |
| 2005/0144478 A1* | 6/2005 | Yamanaka et al. | 713/201 |
| 2005/0198274 A1* | 9/2005 | Day | 709/224 |
| 2006/0015574 A1* | 1/2006 | Seed et al. | 709/219 |
| 2006/0280303 A1* | 12/2006 | Gupte | 380/239 |
| 2007/0027812 A1* | 2/2007 | Ogawa et al. | 705/57 |
| 2008/0071859 A1 | 3/2008 | Seed et al. | |
| 2008/0298580 A1* | 12/2008 | Suu et al. | 380/42 |
| 2010/0306257 A1* | 12/2010 | Levy | 707/770 |

FOREIGN PATENT DOCUMENTS

| | | |
|---|---|---|
| KR | 1020030029244 | 4/2003 |

OTHER PUBLICATIONS

Waller et al., "Securing the Delivery of Digital Content Over the Internet", Electronics & Communication Engineering Journal, vol. 14, Issue 5, Oct. 2002, pp. 239-248.

\* cited by examiner

CONTENT DELIVERY NETWORK ENCRYPTION

This application claims the benefit of co-pending U.S. Provisional Application Ser. No. 61/102,809 filed on Oct. 3, 2008, which is incorporated by reference herein.

BACKGROUND

This disclosure relates in general to content delivery networks (CDNs) and, but not by way of limitation, to delivery of content while protecting the content.

Content delivery networks (CDNs) are used by originators of content to offload delivery of content objects. CDNs distribute edge servers throughout the Internet that host and/or cache content for content originators as a service. A content originator may overload their servers provide poor quality of service (QoS) or worse without reliance on a CDN.

End users often are unaware that they are receiving their content from a CDN. Because the CDN are largely kept invisible to the end user, it is often only URLs that are given to the CDN. The URLs are correlated to a content object that is served from the CDN. Where a content object is currently missing from the part of the CDN receiving the request, other portions of the CDN or the origin server can be queried for the content object.

CDNs typically service a large number of end user systems requesting content that content originators may want protected through the CDN. Bulk theft can happen if some or all of a CDN is compromised. With high-definition video being delivered with CDNs, the threat of losing digital copies in bulk would worry a content originator. Hacking by outsiders and theft by insiders could result in loss of digital copies of content objects.

SUMMARY

In one embodiment, the present disclosure provides for delivering video and/or audio content to end users encrypted within a content delivery network (CDN) for content originators. CDNs transport content for content originators to end user systems in a largely opaque manner. Caches and origin servers in the CDN are used to store content. Some or all of the video and/or content is encrypted within the CDN. When universal resource indicators (URIs) are received from an end user system, the CDN can determine the key used to decrypt the content object within the CDN before delivery. Where there is a cache miss, an origin server can be queried for the content object, which is encrypted in the CDN.

In another embodiment, the present disclosure provides a method for protecting content within a CDN that delivers content for content originators. A URI specifying a content object is received. The URI is analyzed to determine if the content object is protected with encryption within the CDN. The content object is searched for within the CDN. The content object is requested from an origin server when the content object cannot find the content object cached within the CDN. The URI is analyzed to find a key from a number of keys. The key for the content object is retrieved. The content object is encrypted with the key to create an encrypted content object. The encrypted content object is cached in the CDN. The encrypted content object or a portion thereof is decrypted with the key as the content object is passed to an end user computer.

In yet another embodiment, the present disclosure provides a CDN for delivering content to end users encrypted within the CDN for content originators. The CDN includes a key database comprising a number of keys, an interface to the Internet and an edge server comprising a content database for caching content. The number of keys are indexed by information derivable from the URI information. A key is determined from the number of keys by analysis of a URI from an end user system. The interface requests the content object from an origin server. The CDN requests content from origin servers when not cached in the CDN. The edge server receives the URI specifying a content object. The edge server analyzes the URI to determine if the content object is protected with encryption within the CDN. The edge server stores the content object in the content database. The edge server decrypts the content object or a portion thereof with the key before delivery to an end user.

In still another embodiment, the present disclosure provides a CDN for delivering content to end users encrypted within the CDN for content originators. The CDN comprising: means for receiving a URI specifying a content object; means for analyzing the URI to determine if the content object is protected with encryption within the CDN; means for searching for the content object within the CDN; means for requesting the content object from an origin server when the content object cannot find the content object cached within the CDN; means for analyzing the URI to find a key from a number of keys; means for retrieving the key for the content object; means for encrypting the content object with the key to create an encrypted content object; means for caching the encrypted content object in the CDN; and means for decrypting the encrypted content object or a portion thereof with the key as the content object is passed to an end user computer.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
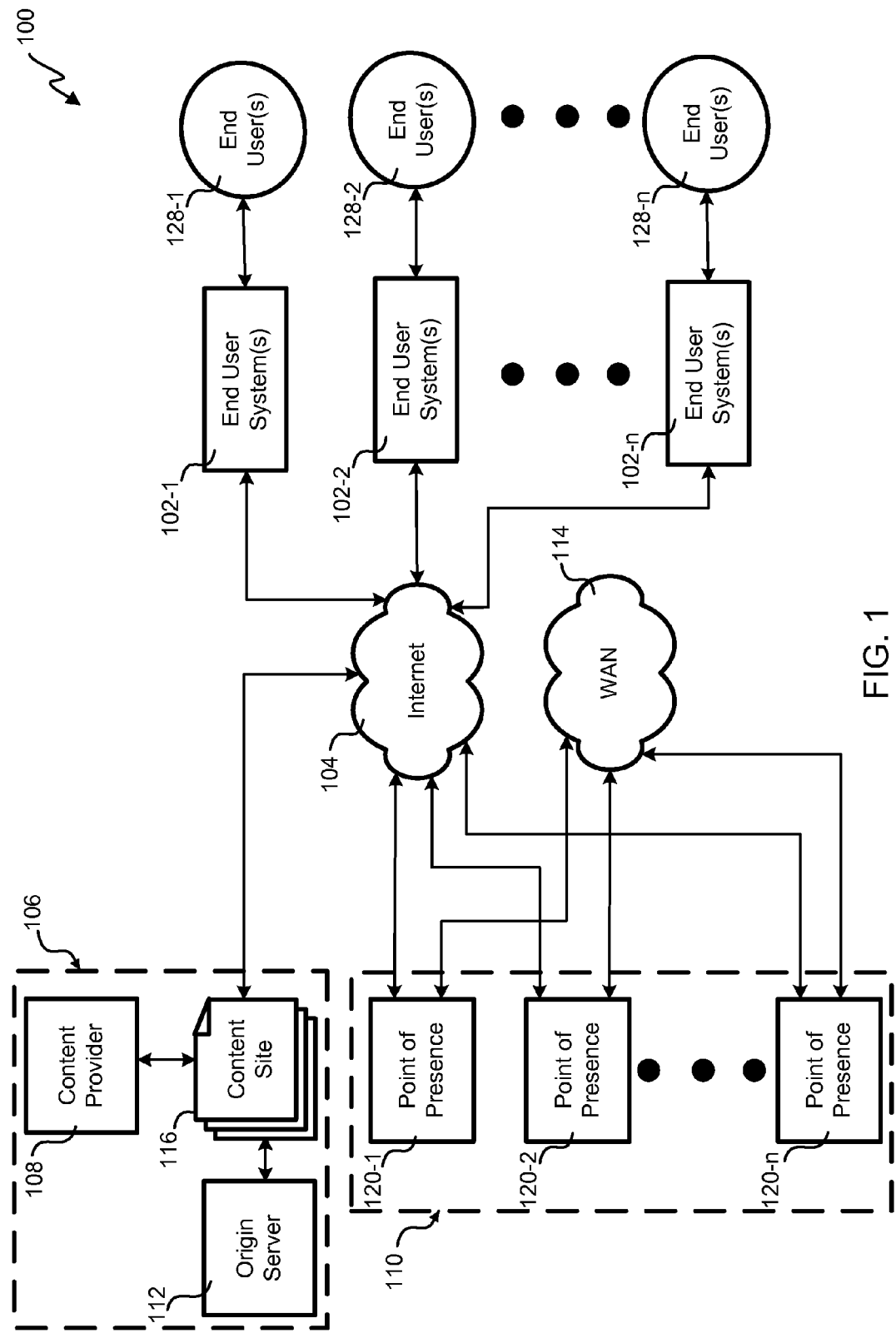
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can both cache and/or host content in various embodiments for third parties to offload delivery and typically provide better quality of service (QoS).

In this embodiment, the content distribution system 100 locates the content objects (or portions thereof) and distributes the content objects to an end user system 102. The content objects are dynamically cached within the CDN 110 to improve the QoS. A content object is any content file or content stream and could include, for example, video, pictures, data, audio, software, and/or text. The content object could be live, delayed or stored. Throughout the specification, references may be made to a content object, content, content stream and/or content file, but it is to be understood that those terms could be used interchangeably wherever they may appear.

Many content providers 108 use a CDN 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 that are proximate to end user systems 102. Multiple POPs use the same IP address such that an Anycast routing scheme is used to find a POP likely to be close to the end user in a network sense for each request. In addition to the Internet 104, a wide area network (WAN) 114 or other backbone may couple the POPs 120 with each other and also couple the POPs 120 with other parts of the CDN 110.

When an end user 128 requests a web page through its respective end user system 102, the request for the web page is passed either directly or indirectly via the Internet 104 to the content originator 106. The content originator 106 is the source or re-distributor of content objects. The content site 116 is an Internet web site accessible by the end user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into the URLs for a web page. In any event, the request for content is handed over to the CDN 110 in this embodiment by using an Anycast IP address corresponding to two or more POPs 120.

Once the request for a content object is passed to the CDN 110, the request is associated with a particular POP 120 within the CDN 110 using the Anycast routing scheme. The particular POP 120 may retrieve the portion of the content object from the content provider 108. Alternatively, the content provider 108 may directly provide the content object to the CDN 110 and its associated POPs 120 through prepopulation, i.e., in advance of the first request. In this embodiment, the content objects are provided to the CDN 110 and stored in one or more CDN servers such that the portion of the requested content may be served from the CDN 110. The CDN servers include edge servers that actually serve end user requests. The origin server 112 holds a copy of each content object for the content originator 106. Periodically, the content of the origin server 112 may be reconciled with the CDN 110 through a cache, hosting and/or pre-population algorithm. Some content providers could use an origin server within the CDN 110 to host the content and avoid the need to maintain a copy.

Once the content object is retrieved, the content object is stored within the particular POP 120 and is served from that POP to the end user system 102. The end user system 102 receives the content object and processes it for use by the end user 128. The end user system 102 could be a personal computer, media player, handheld computer, Internet appliance, phone, IPTV set top, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments.

Content can be protected during the distribution process. The content originator 106 protects the content objects with encryption. An encrypted link can be used between the content originator 106 and the CDN 110 when transferring the content object, which can be unencrypted. The CDN encrypts the content object upon receipt before hosting or caching the content object. Decryption is performed before sending the content object or a portion thereof to an end user system 102. An encrypted link can be used for the delivery or the content object could be encrypted, watermarked, fingerprinted, and/or have digital rights management (DRM) applied.

The content originator could encrypt the content object instead of or in addition to use of an encrypted link when transferring content for hosting by the CDN or when there is a cache miss within the CDN. Each content originator 106 could have a key that is known to both content originator 106 and CDN 110. The various content originators 106 could have different unique keys that are used to decrypt the content object or portion thereof before sent to an end user system 102.

In another embodiment, the content originator 106 could interact with a CDN key database for a content object where there is a key unique to each content object and content originator 106. An encrypted link would be used when interacting between the content originator 106 and the CDN key database. The content originator 106 requests a key that is used by the content originator 106 to encrypt the content object before it is sent to the CDN. The CDN uses the key when decrypting the content object or a portion thereof. A different embodiment could store the keys at the content originator 106 that are requested by the CDN when needed using an encrypted link.

Figure 2A:
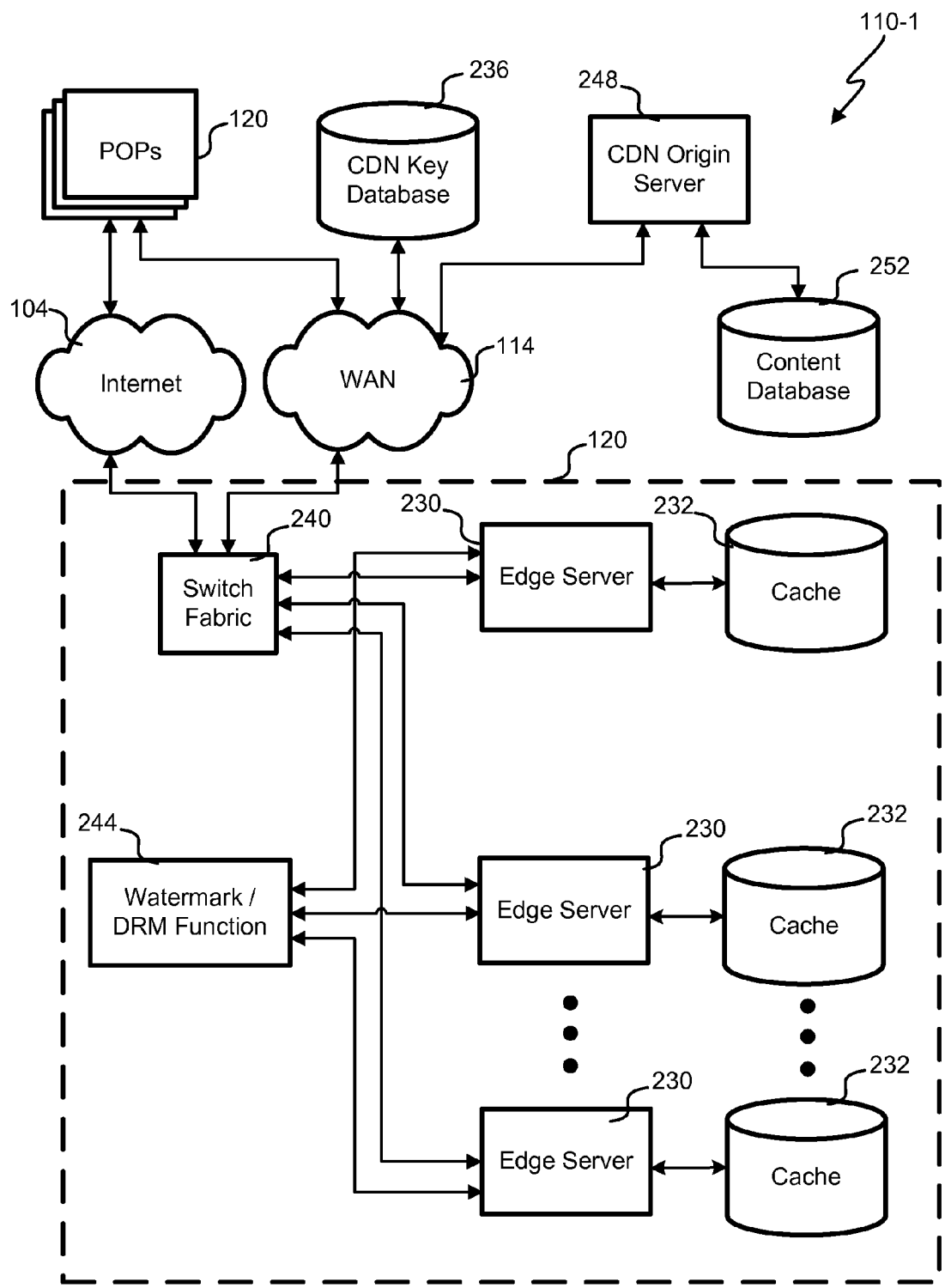
FIGS. 2A, 2B and 2C depict block diagrams of embodiments of a content delivery network (CDN)

With reference to FIG. 2A, a block diagram of an embodiment of a CDN 110-1 is shown. Although only one POP 120 is shown in detail, there are a number of POPs 120 similarly configured throughout the CDN 110. The POPs communicate through a WAN 114 and/or the Internet 104 when locating content objects. An interface to the Internet 104 to the POP 120 accepts requests for content objects from end user systems 102. The request comes from an Internet protocol (IP) address in the form of a universal resource indicator (URI).

Switch fabric 240 assigns the request one of the edge servers 230 according to a routing scheme.

The edge server 230 assigned the content object request analyzes the URI to determine if it corresponds to an encrypted content object. Other embodiments check a cache 232 of the edge server 230 and metadata, the file system, a table or other methods can indicate that the content object referenced by the URI is protected in the cache with encryption. The encryption used in one edge server cache 232 can be different from other edge server caches 232 in other POPs 120 or even in the same POP 120.

In one embodiment, the URI is a request that indicates a file and an address and optionally a encryption variable to indicate if the file is encrypted. In another embodiment, the encryption variable is not within the URI, but the URI can be correlated to a encryption variable, which indicates if the file is encrypted. Optionally, the URI can also include a path, origin location, variable(s), a prefix, etc. In some form, the URI is passed to various caches and/or host servers of the CDN 110 in an attempt to find a requested content object. It is to be understood that when the term URI is used, it doesn't necessarily require any format and just conveys at least where to find a content object.

The URI either has the encryption variable or can be otherwise correlated to an encryption variable. For example, ACME.llnw.net/videos/sports/game.mov?red5 is a URI with an ACME prefix, a llnw.net domain, a videos/sports path, a game.mov filename, and a red5 encryption variable. The URI itself, the ACME prefix and/or red5 in this example could be used by edge servers 230 to determine if a content object is encrypted.

One embodiment hashes the URI or a portion of the URI. The hash is used to query for parameters associated with the URI from a CDN key database 236. Passing of keys to/from the CDN database 236 uses an encrypted channel. Other embodiments could use other information from the URI to query from the CDN key database 236, for example, the prefix ACME could correspond to a key that is used for all content referenced with a URI having an ACME prefix. In various embodiments, there could be different keys for the content originator, content partner and/or another party in the supply chain; the content object, its format, its bitrate, its size, and/or other attributes of the content object; the particular CDN, POP, cache server and/or edge server. For example, high-definition video could be encrypted, but standard-definition content would not.

In some cases, the CDN 110 is used to host content for others. A secure transfer utility like S/FTP can be used to upload content to a CDN origin server 248. The content object can be encrypted automatically and stored in the content database 252 after upload. In some embodiments, the content object is encrypted during the transfer in the key it will be protected with in the CDN 110. The content originator 106 loads the content object into the CDN 110 and places the key or keys into the CDN key database 236. The keys are stored and indexed according to the way they will later be retrieved. For example, the hash of the URI is stored if the hash is later used to find the key when the URI is received.

Some embodiments could be encrypted in a number of keys successively. For example, a content object could be encrypted with a key for a CDN and then encrypted with a different key unique to an edge server. Decryption would require both keys to get the content object in the clear. Other embodiments could combine one or more keys and use the combination as a new key to encrypt the content object such that both were required to get the content object in the clear.

Some embodiments pass the content object into and out of the CDN in an encrypted form or using an encrypted channel, socket or tunnel during the delivery process. When the cache (s) 232 of the CDN or the content database 252 do not hold a requested content object, it is retrieved from the origin server 112 of the content originator 106. Encrypted streams using RTMPE, HTTP-S, RTMPS, or other protocols can be used to protect a content object read from the content originator 106. The content object would be encrypted and cached after it enters the CDN 110 and the key would be stored in the CDN key database 236.

In some cases, the content originator 106 could encrypt the content object and provide the key to the CDN 110 after delivery so it can be decrypted and encrypted in the key of the CDN 110. In one embodiment, the content object is left encrypted with the content originator key and encrypted again with the CDN key. The content originator key would be stored in the CDN key database 236 that that both decryptions could be performed upon delivery of the content object to an end user.

The delivery to the end user system 102 could also be protected with an encrypted tunnel and/or encryption of the content object itself. This embodiment uses a watermark/ digital rights management (DRM) function 244 to protect the content object. A watermark embeds information about the end user system 102 into the content object by weaving it through the content object in a manner that does not reduce the quality appreciably and is not easily removed. DRM generally protects access and use of the content object in conjunction with software on the end user system 102 with rules enforced by the software. A fingerprint can also be used that puts information into the content object as metadata.

Any or all of watermarking, fingerprinting and/or DRM can be used to protect the content object in various embodiments. One a URL-by-URL basis, these three protection mechanisms can be evoked. Information in the URL or correlated to the URL can be placed into the content object or define the rules for the DRM. Information that might go into the fingerprint or watermark include IP address of the end user system, account number or other variable from URI, time and date of delivery, the URI or a portion thereof, a serial number unique to the particular delivery, etc. The information embedded into a content object generally allows later determining the end user system 102 and/or end user 128 that received the content object.

Figure 2B:
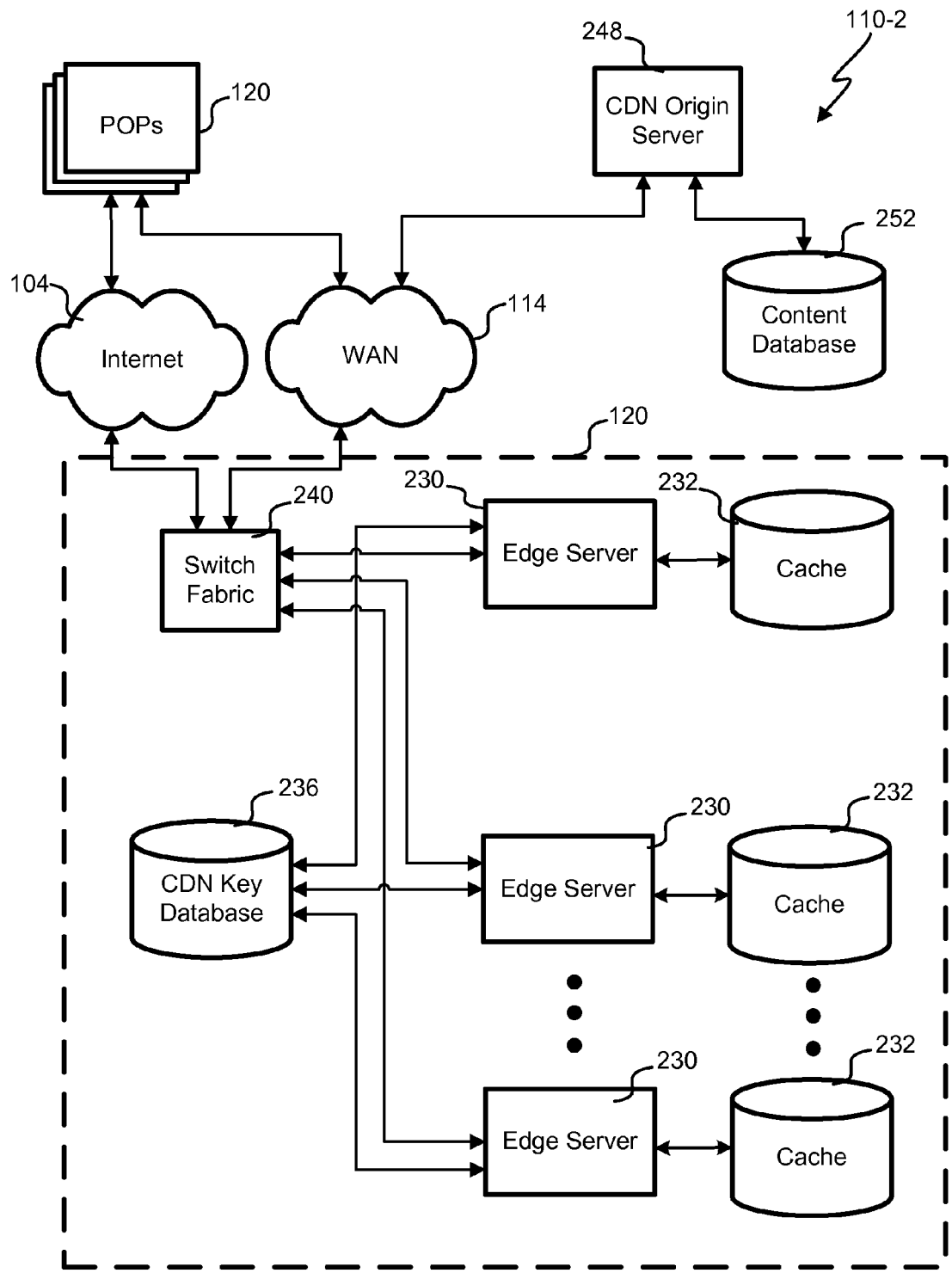

Referring to FIG. 2B, a block diagram of an embodiment of a CDN 110-2 is shown. This embodiment differs from the embodiment of FIG. 2A by moving the CDN key database 236 into the POP 120 and removing the watermark/DRM function 244. Each POP 120 could have its own CDN key database 236. All POPs 120 use different keys such that a compromise of one POP would not expose the content on all POPs 120 in this embodiment. Other embodiments could have the CDN key databases 236 in the various POPs 120 reconciled to contain the same keys. There could be different keys for each edge server 230, each content object, and/or each end user IP address to further compartmentalize the content.

Figure 2C:
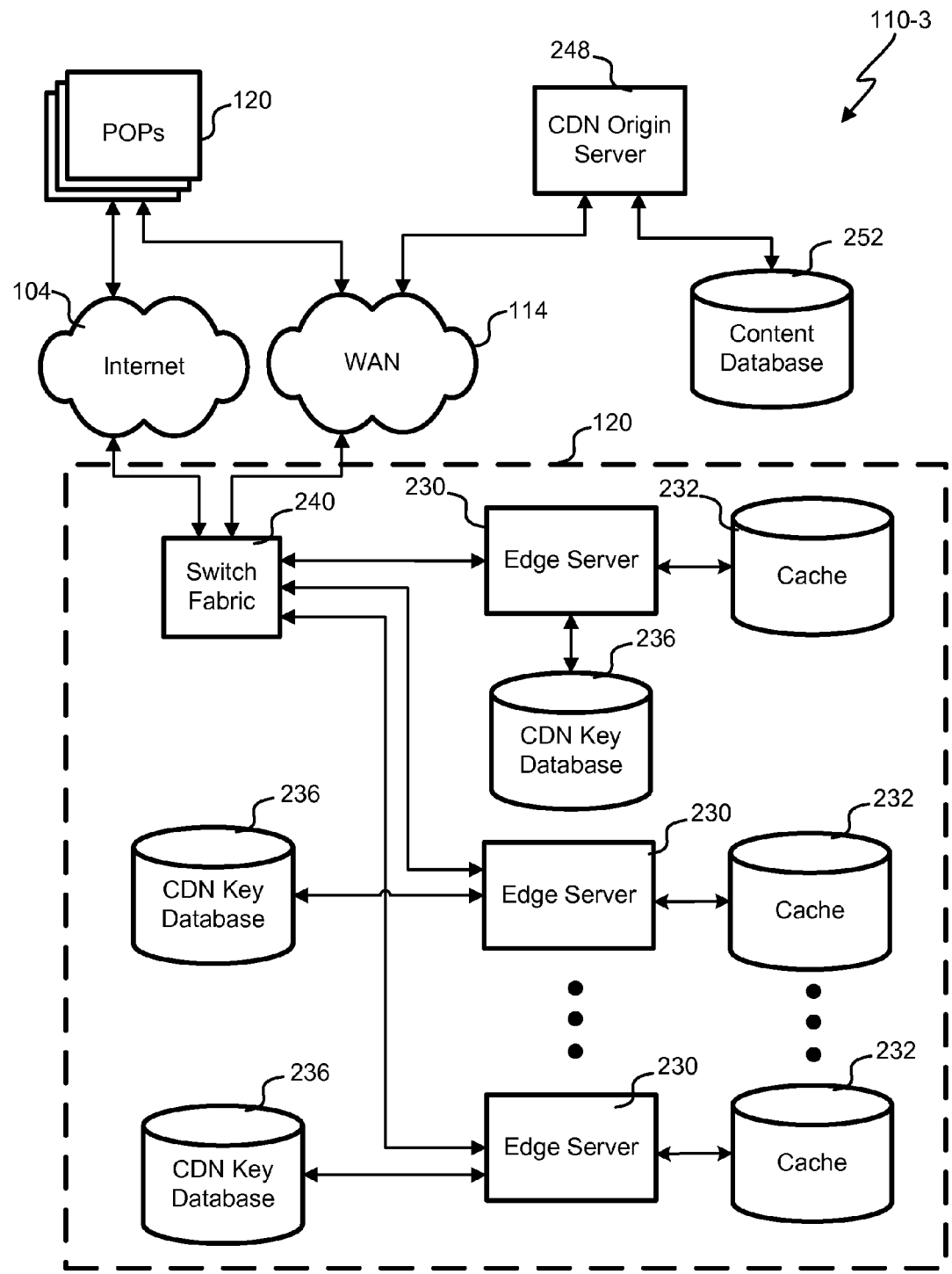

With reference to FIG. 2C, a block diagram of an embodiment of a CDN 110-3 is shown. This embodiment differs from the embodiment of FIG. 2B in that there is a CDN key database 236 for each edge server. This embodiment has different keys for the same content object stored a number of edge server caches 232. Compromise of the CDN key database 236 for one edge server 230 would not expose the content on other edge servers 230 to theft.

Figure 3:
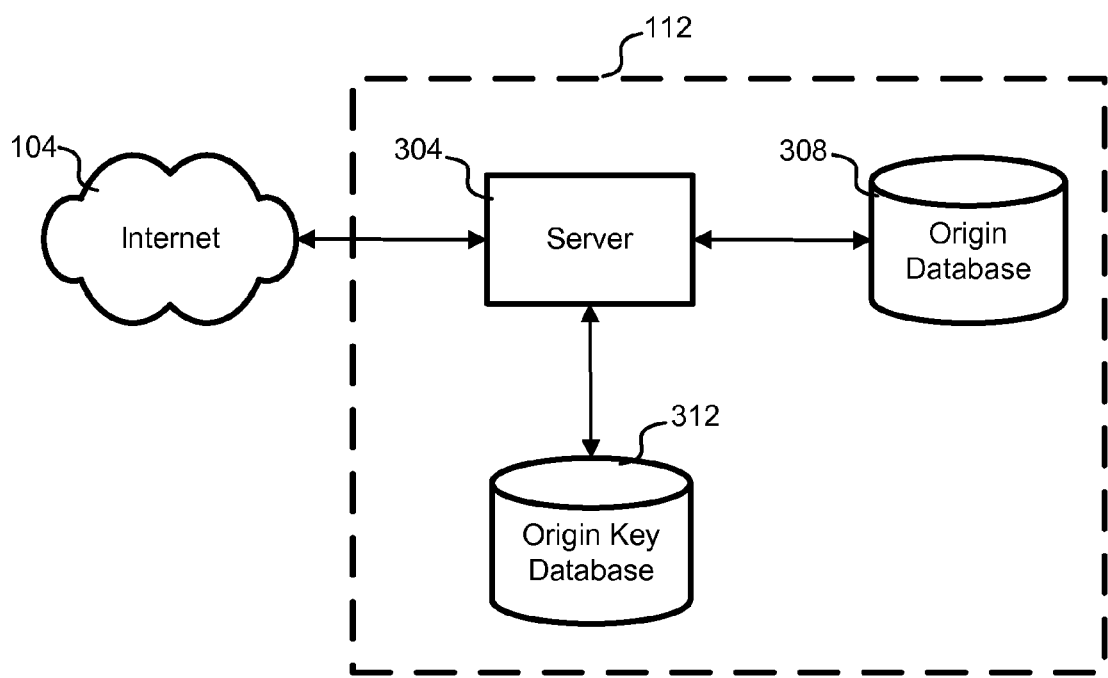
FIG. 3 depicts a block diagram of an embodiment of an origin server.

Referring to FIG. 3, a block diagram of an embodiment of an origin server 112 coupled to the Internet 104 is shown. Some content originators 106 host their content in an origin sever 112, while others host using the CDN origin server 248. The origin server includes a server 304, an origin database 308 and an origin key database 312. The server 304 can serve content from the origin database 308 that may be requested by an end user system 102 or the CDN 110 on a cache miss. In this embodiment, content objects in origin database 308 are protected with encryption.

The origin key database 312 holds keys that protect the content objects in the origin database 308. These same keys may be used within the CDN to protect content objects as they make their way to the end user computers 102 in one embodiment. The keys in the origin key database 312 would be passed to the CDN key database(s) 236 using a secure channel and/or encryption. Where the origin server 112 directly delivers to the end user system 102 the content object could be decrypted as it is streamed.

In another embodiment, the origin key database 312 has keys that are used in the origin server 112. Different keys are used in the CDN key database(s) 236. Transfer of a content object involves decryption from the old key and encryption into the new key. The decryption could be performed before the transfer to the CDN or afterward.

Figure 4:
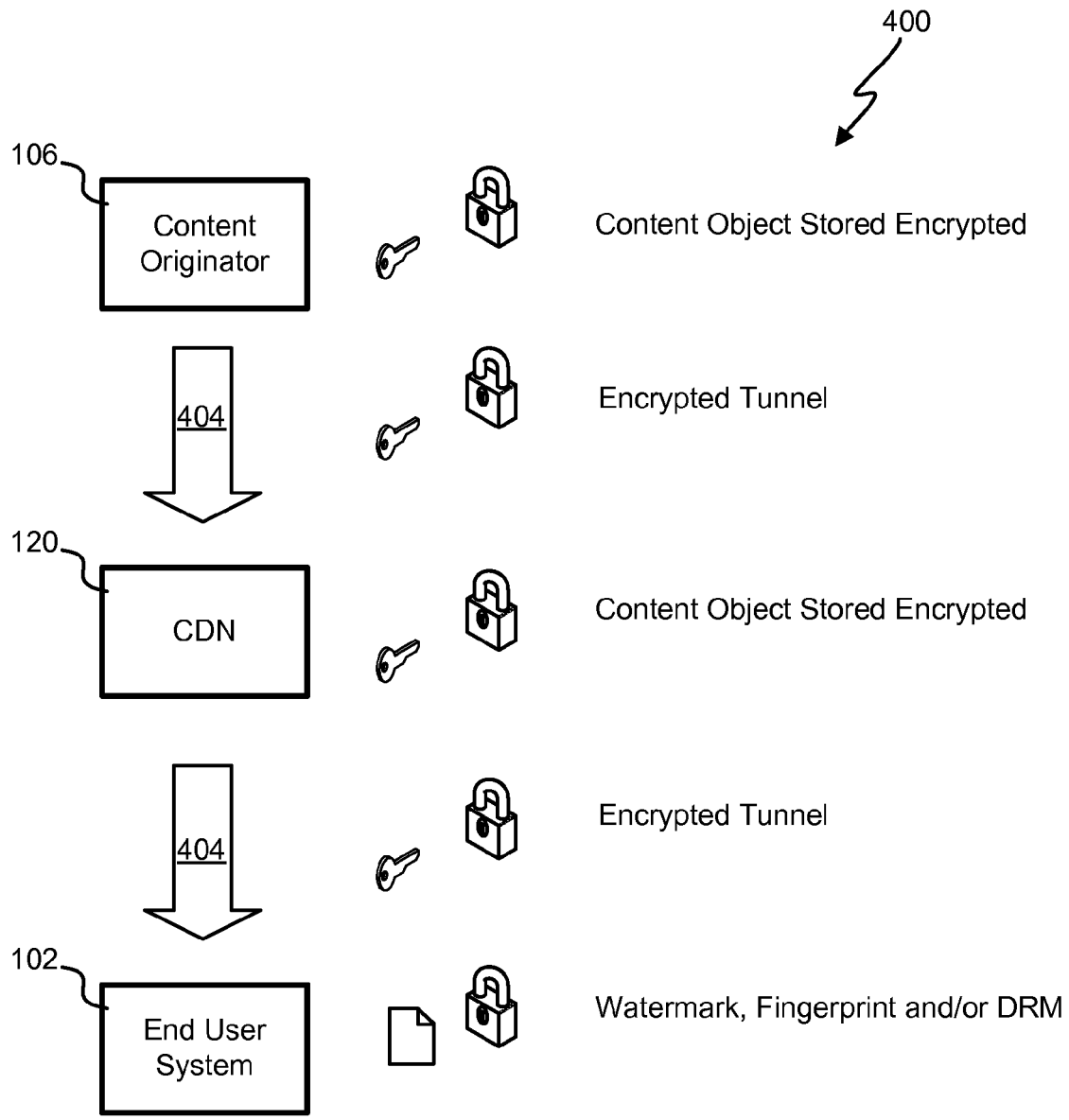
FIG. 4 depicts a diagram of an embodiment of a content protection scheme.

With reference to FIG. 4, a diagram of an embodiment of a content protection scheme 400 is shown. Content flows from one or more content originators 106. The content originators 106 may encrypt some or all of their content objects. The content can be protected in a key of the content originator 106 or the CDN 110 or not encrypted at all. An encrypted tunnel 404 is optionally used between the content originator 106 and the CDN 110. Within the CDN 110, the content object is encrypted. Keys are discernable within the various caches and databases of the CDN. Regardless of key, the caches can determine redundant content objects such that only one copy need be stored in encrypted form.

Content is requested from the CDN 110 and delivered to end user systems 102. An encrypted tunnel is optionally used between the CDN 110 and the end user system 102. This embodiment does not encrypt the content object sent to the end user, but other embodiments could encrypt the content object before passing it to the end user system 102. Watermarking, fingerprinting and/or DRM are used to protect the content object as it passes to and is used by the end user system 102.

Figure 5:
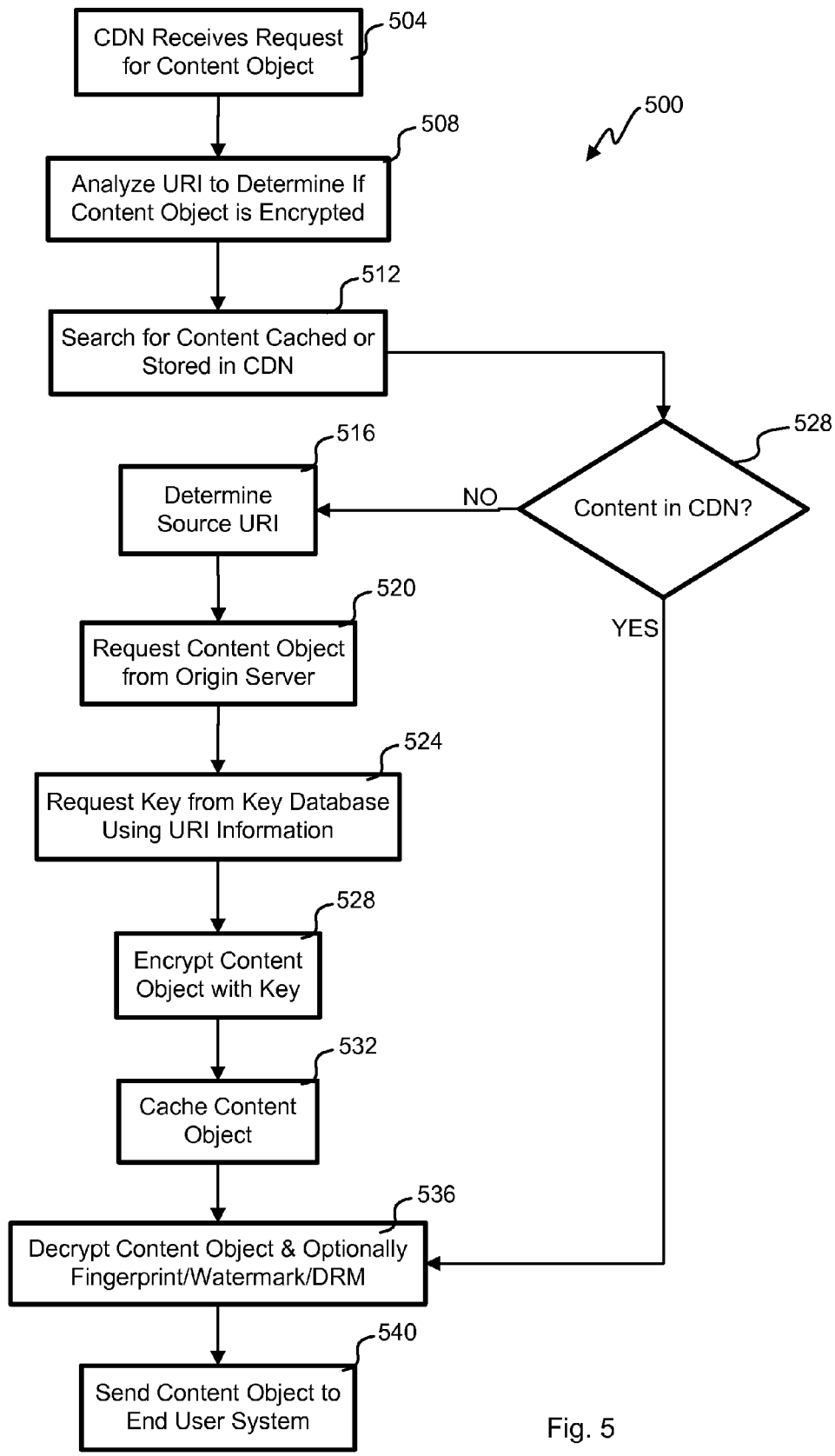
FIG. 5 illustrates a flowchart of an embodiment of a process for delivering a content object with a CDN while protecting the content object within the CDN.

Referring to FIG. 5, a flowchart of an embodiment of a process 500 for delivering a content object with a CDN while protecting the content object is shown. The depicted portion of the process 500 begins in block 504 where the CDN 110 receives a request for a content object 504. The URI is analyzed to determine if the content object is encrypted in block 508. Other embodiments could find the content object and determine from the content object or a table if it were encrypted. In any event, the content object referenced in the URI is searched for within the CDN in block 512. Depending on the content object, it could be cached and/or hosted.

Where the content object is found in the CDN in block 528, processing jumps to block 536 where the content object is decrypted with the appropriate key retrieved from the CDN or origin server. The end user system 102 (browser or otherwise) may request a range of bytes from the file instead of the whole file at once. The edge server 230 can extract and decrypt an arbitrary range of bytes from the file without having to decrypt the entire file. Optionally, fingerprinting, watermarking and/or DRM can be added to the content object before delivery to the end user system 102. In block 540, the content object or portion thereof is sent to the end user system 102 optionally using an encrypted channel or with encryption of the content object.

Where the content object cannot be found within the CDN 110 in block 528, processing continues to 516 to handle the cache miss. A source of the URI is determined in block 516 that could be an IP address along with other elements of a URI. The content object is requested form the origin server in block 520. The origin server could decrypt and encrypt the content object for the key used in the CDN 110 or could rely upon the CDN 110 for the encryption.

In block 524, the key is obtained from the CDN key database 236 and/or origin key database 312. Before storing in a database or cache, the content object is encrypted with the key in block 528. The content object is stored in a cache of the CDN in block 532. Processing continues to blocks 536 and 540 where the content object is decrypted with the key, protected and delivered as discussed above. The process 500 then repeats for each content object request. In some cases, the content object is not encrypted and the cryptographic portions of the process 500 would not be performed.

A number of variations and modifications of the disclosed embodiments can also be used. For example, some of the above embodiments protect the exchange between content originator and CDN, but it is to be understood that there could be any number of links in a chain between the content originator and CDN each with the ability to encrypt content objects and tunnels while exchanging necessary keys.

While the principles of the disclosure have been described above in connection with specific apparatuses and methods, it is to be clearly understood that this description is made only by way of example and not as limitation on the scope of the disclosure.

What is claimed is:

1. A method for protecting content within a content delivery network (CDN) that delivers content for content originators, method comprising:
   receiving a URI specifying a content object;
   analyzing the URI to determine if the content object is protected with encryption within the CDN;
   searching for the content object within the CDN;
   requesting the content object from an origin server when the content object cannot find the content object cached within the CDN;
   analyzing the URI to find a key from a plurality of keys;
   retrieving the key for the content object;
   encrypting the content object with the key to create an encrypted content object;
   caching the encrypted content object in the CDN;
   decrypting the encrypted content object or a portion thereof with the key as the content object is passed to an end user computer; and
   watermarking the content object with a fingerprint that allows determination of an IP address that the URI was requested from.

2. The method for protecting content within the CDN that delivers content for content originators as recited in claim 1, further comprising decrypting the content object received from the origin server using an origin key different from the key.

3. A method for protecting content within a CDN that delivers content for content originators, the method comprising:
   receiving a URI specifying a content object;
   analyzing the URI to determine if the content object is protected with encryption within the CDN;
   searching for the content object within the CDN;

requesting the content object from an origin server when the content object cannot find the content object cached within the CDN;
analyzing the URI to find a key from a plurality of keys;
retrieving the key for the content object;
encrypting the content object with the key to create an encrypted content object;
caching the encrypted content object in the CDN;
decrypting the encrypted content object or a portion thereof with the key as the content object is passed to an end user computer; and
watermarking the content object to create a watermarked content object, wherein a source Internet address of the URI is embedded in watermarked content object.

4. A method for protecting content within a CDN that delivers content for content originators, the method comprising:
receiving a URI specifying a content object;
analyzing the URI to determine if the content object is protected with encryption within the CDN;
searching for the content object within the CDN;
requesting the content object from an origin server when the content object cannot find the content object cached within the CDN;
analyzing the URI to find a key from a plurality of keys;
retrieving the key for the content object;
encrypting the content object with the key to create an encrypted content object;
caching the encrypted content object in the CDN;
decrypting the encrypted content object or a portion thereof with the key as the content object is passed to an end user computer; and
fingerprinting the content object to create a fingerprinted content object, wherein a source Internet address of the URI and/or information from the URI is embedded in fingerprinted content object.

5. The method for protecting content within the CDN delivering for content originators as recited in claim 4, wherein the origin server is outside the CDN.

6. A method for protecting content within a CDN the CDN that delivers content for content originators, the method comprising:
receiving a URI specifying a content object;
analyzing the URI to determine if the content object is protected with encryption within the CDN;
searching for the content object within the CDN;
requesting the content object from an origin server when the content object cannot find the content object cached within the CDN;
analyzing the URI to find a key from a plurality of keys;
retrieving the key for the content object;
encrypting the content object with the key to create an encrypted content object;
caching the encrypted content object in the CDN;
decrypting the encrypted content object or a portion thereof with the key as the content object is passed to an end user computer; and
watermarking the content object with a fingerprint that allows determination of an account that the URI came, wherein the fingerprint is derived from information in the URI.

7. A CDN for delivering content to end users encrypted within the CDN for content originators, the CDN comprising:
a key database comprising a plurality of keys, wherein:
the plurality of keys are indexed by information derivable from URI information, and
a key is determined from the plurality of keys by analysis of a URI from an end user system;
an interface to the Internet, wherein the interface requests the content object from an origin server;
an edge server comprising a content database for caching content, wherein:
the CDN requests content from origin servers when not cached in the CDN
the edge server receives the URI specifying a content object,
the edge server analyzes the URI to determine if the content object is protected with encryption within the CDN,
the edge server stores the content object in the content database, and
the edge server decrypts the content object or a portion thereof with the key before delivery to an end user; and
a fingerprinting function that embeds a source Internet address of the URI and/or information from the URI into the content object.

8. The CDN for delivering content to end users encrypted within the CDN for content originators as recited in claim 7, wherein the key is unique to the edge server being different from keys used by a remainder of edge servers in the CDN.

9. The CDN for delivering content to end users encrypted within the CDN for content originators as recited in claim 7, wherein the key is unique to a content originator supplying the content object being different from keys used by a remainder of content originators using the CDN.

10. A CDN for delivering to end users encrypted within the CDN for content originators, the CDN comprising:
means for receiving a URI specifying a content object;
means for analyzing the URI to determine if the content object is protected with encryption within the CDN;
means for searching for the content object within the CDN;
means for requesting the content object from an origin server when the content object cannot find the content object cached within the CDN;
means for analyzing the URI to find a key from a plurality of keys;
means for retrieving the key for the content object;
means for encrypting the content object with the key to create an encrypted content object;
means for caching the encrypted content object in the CDN;
means for decrypting the encrypted content object or a portion thereof with the key as the content object is passed to an end user computer; and
means for watermarking the content object with a fingerprint that allows determination of an IP address that the URI was requested from.

11. The CDN for delivering content to end users encrypted within the CDN for content originators as recited in claim 10, further comprising means for decrypting the content object received from the origin server using an origin key different from the key.

12. A CDN for delivering to end users encrypted within the CDN for content originators, the CDN comprising:
means for receiving a URI specifying a content object;
means for analyzing the URI to determine if the content object is protected with encryption within the CDN;
means for searching for the content object within the CDN;
means for requesting the content object from an origin server when the content object cannot find the content object cached within the CDN;

means for analyzing the URI to find a key from a plurality of keys;

means for retrieving the key for the content object;

means for encrypting the content object with the key to create an encrypted content object;

means for caching the encrypted content object in the CDN;

means for decrypting the encrypted content object or a portion thereof with the key as the content object is passed to an end user computer; and means for watermarking the content object to create a watermarked content object, wherein a source Internet address of the URI is embedded in watermarked content object.

13. A CDN for delivering to end users encrypted within the CDN for content originators, the CDN comprising:

means for receiving a URI specifying a content object;

means for analyzing the URI to determine if the content object is protected with encryption within the CDN;

means for searching for the content object within the CDN;

means for requesting the content object from an origin server when the content object cannot find the content object cached within the CDN;

means for analyzing the URI to find a key from a plurality of keys;

means for retrieving the key for the content object;

means for encrypting the content object with the key to create an encrypted content object;

means for caching the encrypted content object in the CDN;

means for decrypting the encrypted content object or a portion thereof with the key as the content object is passed to an end user computer; and means for fingerprinting the content object to create a fingerprinted content object, wherein a source Internet address of the URI and/or information from the URI is embedded in fingerprinted content object.

14. A CDN for delivering to end users encrypted within the CDN for content originators, the CDN comprising:

means for receiving a URI specifying a content object;

means for analyzing the URI to determine if the content object is protected with encryption within the CDN;

means for searching for the content object within the CDN;

means for requesting the content object from an origin server when the content object cannot find the content object cached within the CDN;

means for analyzing the URI to find a key from a plurality of keys;

means for retrieving the key for the content object;

means for encrypting the content object with the key to create an encrypted content object;

means for caching the encrypted content object in the CDN;

means for decrypting the encrypted content object or a portion thereof with the key as the content object is passed to an end user computer; and means for watermarking the content object with a fingerprint that allows determination of an account that the URI came, wherein the fingerprint is derived from information in the URI.

* * * * *